3,411,602
AUTOMATIC SAFETY BELT APPARATUS FOR VEHICLES
Robert E. Royce, 4345 S. Santa Fe, Englewood, Colo. 80110
Filed Nov. 26, 1965, Ser. No. 509,819
15 Claims. (Cl. 180—82)

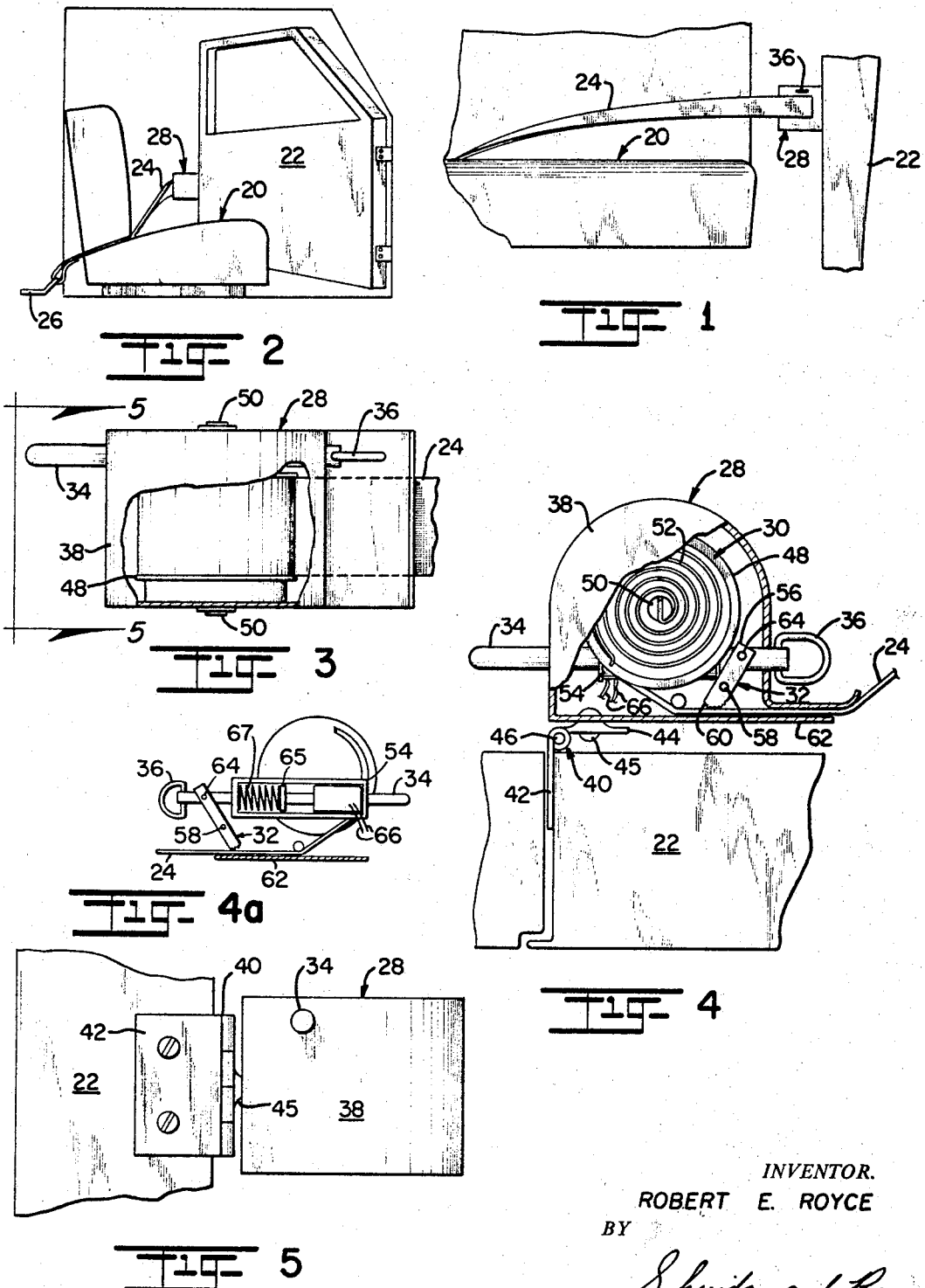

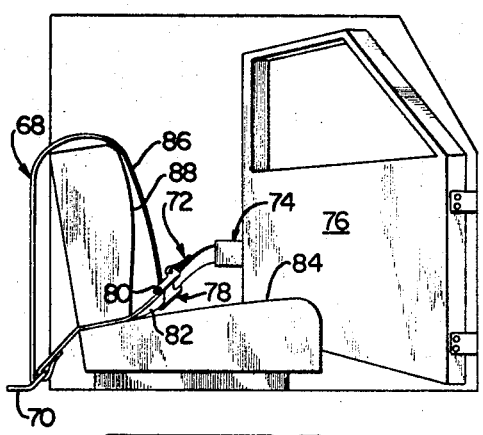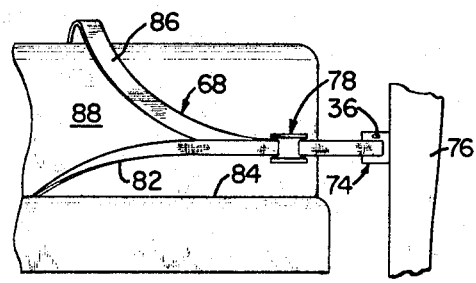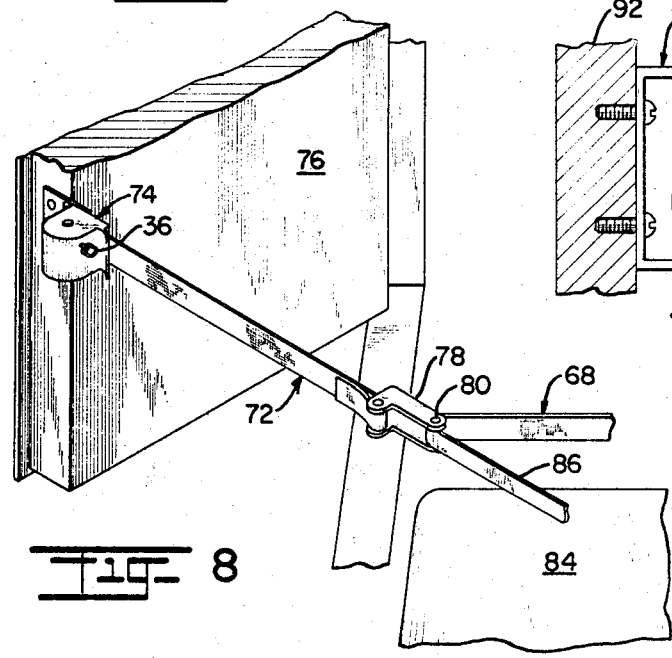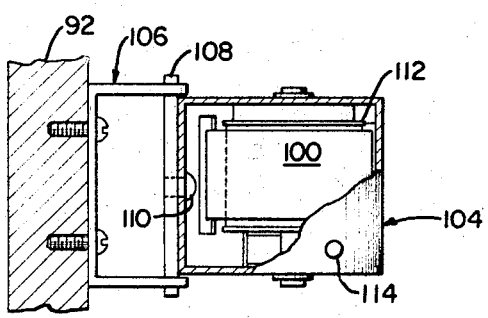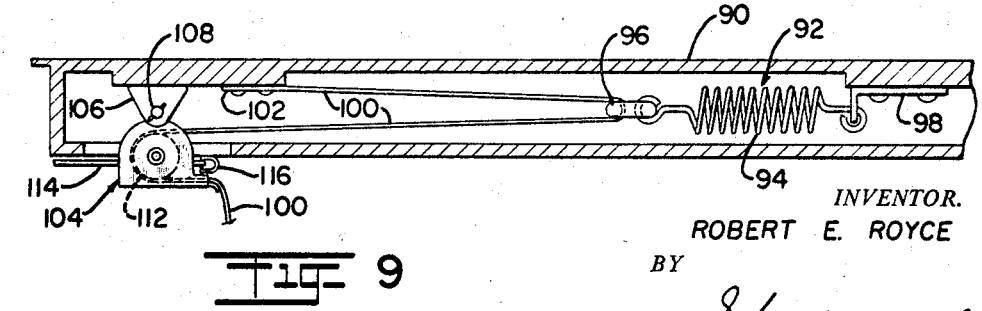

ABSTRACT OF THE DISCLOSURE

This invention relates generally to a safety belt apparatus for persons riding in vehicles and more particularly to a safety belt apparatus which is automatically disposed in partial encompassing engagement about a seated passenger, and which also has actuatable means for securing the passenger to the seat. The seat belt assembly of this invention comprises a seat belt, a first part of which is constructed to be securely anchored relative to one side of a vehicle seat and a second part of which is constructed to be intercoupled with an inner portion of the vehicle door wherein said second part is securely anchored relative to the other side of the vehicle seat and a portion of the other seat belt disposed intermediate said first and second part thereof is uninterrupted in extent and adapted generally to overlie continuously a portion of the vehicle seat for any open or closed position of the vehicle door. The seat belt assembly includes means constructed to be securely attached to a portion of the vehicle for biasing the seat belt in a predetermined manner and means constructed to be securely attached to a portion of a vehicle releasably securing at least a part of the seat belt relative to the vehicle portion. The seat belt assembly includes actuatable means constructed for mounting on a vehicle and maintaining in a closed position a vehicle door disposed adjacent to the vehicle seat over which the seat belt is adapted to overlie. The seat belt assembly also includes means constructed for gimbal mounting on a vehicle door or in a coupling the second part of the seat belt to a portion of the vehicle door. The seat belt assembly includes means for intercoupling the actuatable means and the seat belt securing means wherein in one position thereof the seat belt securing means secures the seat belt relative to a portion of the vehicle while the actuatable means is disposed to prevent opening of a vehicle door, and in another position thereof the seat belt is freely movable relative to the seat belt securing means and the actuatable means is disposed to permit opening of the vehicle door. The seat belt of this seat belt assembly may also include a third part which is securely anchored relative to one side of a vehicle seat wherein a portion of said seat belt disposed intermediate said second and third parts is uninterrupted in extent and adapted to be disposed generally in spaced-apart relation to a generally vertically disposed portion of a vehicle seat for any open or closed position of the vehicle door.

The subject invention relates generally to safety belts or straps for persons riding in vehicles and more particularly to a safety belt apparatus which automatically secures a person to a vehicle seat upon his occupying same and turning on the vehicle's ignition.

Prior art safety belt apparatuses have proven their worth in the use of decreasing injury to the passengers of vehicles. However, previous safety belt apparatuses have been disadvantageous from the viewpoint that none of them automatically secured a passenger to the vehicle seat upon the passenger's occupying the seat and switching on the vehicle's ignition. It has been discovered, however, that a safety belt apparatus constructed in accordance with the subject invention will automatically secure a passenger to a vehicle seat upon the passenger's occupying the seat and switching on the ignition. This unique achievement is accomplished by the use of a seat belt assembly comprising a seat belt having a first portion thereof permanently anchored on one side of the vehicle seat and a second portion thereof permanently secured with respect to a portion of the vehicle door which is disposed on the other side of the vehicle seat wherein an intermediate portion of the seat belt is continuously disposed across a portion of the vehicle seat in any opened or closed position of the vehicle door, means for biasing a portion of said seat belt to move in a predetermined direction whereby said seat belt will be automatically disposed in partially encompassing engagement about a portion of a person upon his occupying the vehicle seat; means for releasable securing a portion of said seat belt with respect to said biasing means, and means for precluding opening of the vehicle door upon actuation of said means to secure a portion of said seat belt with respect to said biasing means.

One of the principal objects of this invention is to provide an improved safety belt apparatus which automatically secures a person to a vehicle seat.

Another object of this invention is to provide a safety belt apparatus which greatly decreases the chance of a passenger from injury while riding in a vehicle.

Another object of this invention is to provide a safety belt apparatus automatic in operation and which continuously maintains a portion of the safety belt across a portion of the vehicle seat for any position of the vehicle door.

Another object of this invention is to provide a safety belt assembly for use in a vehicle comprising a seat belt constructed to have a first portion thereof permanently anchored on one side of the vehicle seat and a second portion thereof constructed to be permanently secured with respect to a portion of a vehicle door to be disposed on the other side of the vehicle seat wherein an intermediate portion of said seat belt is continuously disposed across a portion of a vehicle seat in any open or closed position of the vehicle door, means for biasing a portion of said seat belt to move in a predetermined direction whereby said seat belt will be automatically disposed in partially encompassing engagement about a portion of a person upon his occupying the vehicle seat, means for releasably securing a portion of said seat belt with respect to said biasing means, and preferably means for precluding opening of the vehicle door upon actuation of said means to secure a portion of said seat belt with respect to said biasing means.

Another object of this invention is to provide a safety belt apparatus which automatically disposes itself in partially encompassing engagement about a seated passenger and which automatically secures said passenger to said seat upon switching on the ignition and which releases said passenger in said seat upon switching off of said ignition.

Additional objects and the novel features of this invention will become apparent from the description which follows, taken in conjunction with the accompanying drawings, in which:

FIGURE 1 is a front elevational view showing one embodiment of a safety belt apparatus as constructed in accordance with this invention and mounted on a vehicle;

FIGURE 2 is a side elevational view of the embodiment of a safety belt apparatus as shown generally in FIGURE 1 with the vehicle door shown in a partially opened position;

FIGURE 3 is a side elevational view, partially cut away, of a means for anchoring a portion of a seat belt with respect to a portion of a vehicle door, said vehicle door being shown in a closed position;

FIGURE 4 is a bottom plan view partially cut away of the anchoring means shown in FIGURE 3;

FIGURE 4a is a schematic view showing the interrelationship between the solenoid and the release means;

FIGURE 5 is an elevational view taken along line 5—5 of FIGURE 3;

FIGURE 6 is a front elevational view of another embodiment of a safety belt apparatus constructed in accordance with the subject invention, the vehicle door being shown in a closed position;

FIGURE 7 is a side elevational view of the safety belt apparatus shown in FIGURE 6 with the vehicle door being shown in a partially opened position;

FIGURE 8 is a perspective view of a portion of the apparatus shown in FIGURE 7 as seen by an individual about to enter the vehicle;

FIGURE 9 is a top plan view, in partial cross-section showing another method of biasedly mounting to a vehicle door a safety belt apparatus constructed in accordance with the subject invention; and FIGURE 10 is an end elevational view, in partial cross-section, showing the member 104 of FIGURE 9 attached to member 106.

Referring now to the drawings, in FIGURE 1 is shown a front elevational view of a portion of a vehicle seat 20 and a portion of a vehicle door 22 in a closed position and to which is mounted one embodiment of a safety belt apparatus or assembly constructed in accordance with the subject invention. The safety belt apparatus shown in FIGURES 1–5 comprises a safety belt or strap 24, means 26 for permanently anchoring to a portion of the vehicle on one side of the vehicle seat 20 one end of said strap 24, see FIGURE 2, means 28 for permanently securing the other end of the belt 24 to the vehicle door; means 30 for biasing at least a portion of said seat belt to move in a predetermined direction, see FIGURE 3, means 32 for releasably securing a portion of the seat belt 24 with respect to said biasing means 30, means 34 for precluding opening of the vehicle door 22 and emergency release means 36 for retracting means 34 and releasing means 32. Means 28 includes a housing 38 which is securely mounted to a portion of the door 22 for gimbal movement with respect thereto. The mounting means or hinge 40 for mounting the housing 38 to the door 22 includes a portion 42 which is secured to the door 22 and another portion 44 which is pivotally connected by pin 45 to the housing 28. Thus, it will be understood that the housing 28, as viewed in FIGURE 4, may rotate about pin 45 and independently or simultaneously rotate about pin 46 of the mounting means 40. As previously indicated, this type of mounting results in a gimbal-type movement of housing 38 with respect to the vehicle door 22.

The biasing means 30 includes a drum 48 rotatably mounted upon a shaft 50 and biased to rotate in a predetermined direction by a spring 52. One end of the safety belt 24 is securely attached to a portion of the drum 48.

The releasably securing means 32 includes a spring-biased solenoid 54 that is securely attached to a portion of the housing 38 and a pawl member 56 mounted for pivotal movement about a pin 58. The pawl member 56 is serrated at one end 60 as shown. The serrated end 60 of pawl 56 cooperates with an opposed wall 62 of housing 38 to secure a portion of the safety belt 24 therebetween. The pawl 56 is also connected to the emergency release means 36 by a pin 64. The means 34 for precluding opening of the vehicle door 22 is mounted for reciprocal movement within the solenoid 54. Means 34 has a boss portion 65 formed thereon. A coil spring 67 is mounted intermediate said boss portion 65 and one end of the solenoid 54 thereby biasing means 34 to the right as viewed in FIGURE 4a. The solenoid 54 is connected to a source of power, normally the vehicle's battery (not shown), through wires 66. The circuitry interconnecting solenoid 54 with the vehicle's battery (not shown) includes the vehicle's ignition. The circuitry is so connected that battery power is supplied to the solenoid 54 at all times when the ignition is switched off and when the ignition is switched on battery power is no longer supplied to the solenoid 54. Thus, when the solenoid 54 is connected to battery power, the solenoid is in its retracted position and the serrated end 60 of the pawl member 56 is pivoted in a clockwise direction about pin 58, as viewed in FIGURE 4, to move the serrated end 60 of pawl member 56 out of gripping engagement with a safety belt 24. At the same time due to the connection of the emergency release means 36 with the pawl member 56 through pin 64, the door locking means 34 is retracted thereby permitting the vehicle door 22 to open freely.

In FIGURES 6–8 is shown another embodiment of a safety belt apparatus constructed in accordance with this invention and which is mounted on a vehicle. The safety belt apparatus comprises a safety belt or strap 68 which has both ends thereof securely attached to an anchoring means 70. The safety belt 68 is also attached to interconnecting means 72 which, in turn, is secured to another anchoring means 74. Anchoring means 74 is securely attached with respect to the vehicle door 76. The interconnecting means 72 includes a buckle assembly 78 secured to one end thereof. Said buckle assembly 78 includes a roller 80 about which must pass a portion of the safety belt 68. The anchoring means 74 is similar in construction to the anchoring means 28. Thus, reference should be made to the above description relating to anchoring means 28.

The safety belt 68 as shown in FIGURES 6 and 7 has a first portion 82 disposed to overlie continuously a generally horizontal portion 84 of the vehicle seat for any position of the vehicle door 76 and a second portion 86 disposed to traverse across a portion of the backrest 88 of the vehicle seat for any position of the vehicle door 76.

In FIGURE 9 is shown a modified vehicle door 90 upon which is mounted a safety belt biasing means 92. The biasing means 92 includes a spring 94 which has one end thereof attached to a roller means 96 and the other end thereof attached to a member 98. Member 98 is, in turn, securely attached to a portion of the vehicle door 90. A safety belt 100 passes about roller means 96 and has the end 102 thereof securely fastened with respect to a portion of the door 90. The safety belt 100 also passes through member 104, see also FIGURE 10, which is pivotally connected to door 90 through a bracket means 106. Member 104 is also pivotally connected to pin 108 through pin 110. Thus, member 104 may move in a gimbal manner with respect to door 90. The member 104 contains a roller means 112 about which the safety belt 100 passes. Member 104 includes a door locking means 114 and an emergency release means 116. Member 104 and anchoring means 28 are very similar to each other except that member 104 is used in conjunction with an exteriorly formed biasing means 92 while means 28 has an interiorly disposed biasing means 30. Thus, member 104 includes a spring biased solenoid (not shown) the same as is the case with means 28. An examination of FIGURE 9 reveals that upon opening the vehicle door 90, the spring 94 of the biasing means 92 will be increased in tension thereby decreasing the length of the safety belt 100 that is confined within the door 90 between the roller means 112 of member 104 and the end 102 of the safety belt 100. However, upon closing the vehicle door, said spring 94 will contract thereby increasing the length of the safety belt 100 confined within the door 90 between the roller means 112 of member 104 and the end 102 of the safety belt 100.

The operation of the safety belt apparatus or assembly shown in FIGURES 1–5 is now described. In FIGURE 1, with the vehicle door 22 closed as shown, the safety belt 24 will be lightly tensioned across the vehicle seat 20 as shown. This tensioning is accomplished by the spring 52 of the biasing means 30. Upon opening the vehicle door 22, see FIGURE 2, the safety belt 24 disposed between means 28 and the anchoring means 26 will increase in length as a result of the safety belt 24 unwinding from the drum 48. Such unwinding occurs since the safety belt 24 is free to pass unrestricted between the serrated end 60 of the pawl member 56 and wall 62 of the housing 38. With the door 22 in the open condition as shown in FIGURE 2, a portion of the safety belt 24 is continuously disposed across a portion of the vehicle seat 20. Thus, when a passenger enters the automobile, he will find that the safety belt 24 is automatically disposed across his waist. Upon closing the vehicle door 22, the spring 52 of the biasing means 30 will cause the excess portion of the seat belt to be wound upon the drum 48 until the seat belt 24 is snugly drawn about the passenger's waist. When the vehicle's ignition is switched on, battery power will no longer be supplied to the solenoid 54. Thus, the spring incorporated with the solenoid 54 will cause the pawl member 56 to rotate in a counter clockwise direction, as viewed in FIGURE 4, about pin 58 until the serrated end 60 thereof firmly engages and holds a portion of a seat belt 24 against wall 62 of the housing 38. At the same time, the door locking means 34 translates outwardly from the housing 38 to provide a means for insuring against accidental or inadvertent opening of the vehicle door 22. The seat belt 24 will be firmly held in place by the pawl member 56 until the ignition is switched off or until the emergency release means 36 is actuated.

When the ignition is switched off or the emergency release means 36 is actuated, the pawl member 56 rotates about pin 58 in a clockwise direction, as viewed in FIGURE 4, thereby releasing the safety belt 24 for unrestricted movement along the adjacent surface of wall 62. At such time, the passenger may easily move forwardly against the seat belt 24 to adjust to a new position or to leave the vehicle. It will be understood that upon letting go of the emergency release means, the pawl member 56 will again firmly engage the safety belt 24 if the ignition is still switched in the "on" position.

The operation of the safety belt apparatus or assembly shown in FIGURES 6–8 is similar in operation to the safety belt apparatus described with respect to FIGURES 1–5 except that the safety belt 68 also has a portion thereof which is continuously disposed across either the backrest 88 of the seat or the chest of the vehicle passenger. Thus, a passenger upon entering the vehicle will merely need to slip the portion 86 of the seat belt 68 over his shoulder and across his chest in order to be properly seated with respect to the seat belt 68. Otherwise, the operation and function of the safety belt apparatus or assembly is the same as that described above with respect to FIGURES 1–5.

From the foregoing, it will be readily appreciated that a vastly improved safety belt apparatus or assembly has been described. The improvement results from the fact that a vehicle passenger, upon entering the vehicle, automatically uses the safety belt. Further, the safety belt will be securely maintained about the passenger automatically upon closing the door and turning on the ignition of the vehicle. Thus, the serious safety problems now faced with the use of conventional seat belts has been eliminated, i.e., the passenger will not forget nor can he fail to take advantage of the safety aspects accruing from the use of a seat belt while riding in a vehicle.

It will be readily appreciated that the spring actuated solenoid 54 and its power arrangement as used herein provides a "fail safe" securing arrangement. For example, its operation does not depend upon the existence of power which might not be available as a result of an automobile accident or wreck. It will also be understood that an important safety feature of the subject invention resides in the use of a separate means or precluding opening of the vehicle door during operation of the vehicle. Since the position and therefore the safety of a passenger within a vehicle seat is dependent upon the vehicle's door remaining in a closed position, it is important to provide against inadvertent opening of the door which could occur during an accident.

It is to be understood that this invention is not limited to the exact embodiments of the apparatus as shown and described, which are merely by way of illustration and not apparent to those skilled in the art, and it is therefore intended that the appended claims cover all such changes and modifications.

What I claim is:

1. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to the other side of said seat and a portion of said seat belt disposed intermediate said first and second part thereof is uninterrupted in extent and disposed generally to overlie continuously a portion of said seat for any open or closed position of said vehicle door; means securely attached to a portion of the vehicle for biasing said seat belt in a predetermined manner; and means securely attached to a portion of a vehicle for releasably securing at least a part of said seat belt relative to the vehicle, said seat belt securing means including a biased solenoid adapted to be connected to a source of power; said solenoid being disposed to secure at least part of said seat belt relative to a portion of the vehicle upon being disconnected from a source of power and to permit free movement of said seat belt relative thereto when connected to a source of power.

2. An assembly as described in claim 1 in which said biasing means includes a spring biased, rotatably mounted reel means.

3. A seat belt assembly for use in a vehicle, said assembly comprising a seat belt, a first part of which is constructed to be securely anchored relative to one side of a vehicle seat and a second part of which is constructed to be intercoupled with a portion of a vehicle door wherein said second part is securely anchored relative to the other side of the vehicle seat and a portion of said seat belt disposed intermediate said first and second parts thereof is uninterrupted in extent and adapted generally to overlie continuously a portion of the vehicle seat for any open or closed position of the vehicle door; means constructed to be securely attached to a portion of the vehicle for biasing said seat belt in a predetermined manner; means constructed to be securely attached to a portion of a vehicle releasably securing at least a part of said seat belt relative to the vehicle portion actuatable means constructed for mounting on a vehicle and maintaining in a closed position a vehicle door disposed adjacent to the vehicle seat over which said seat belt is adapted to overlie; and means constructed for gimbal mounting on a vehicle door for intercoupling said second part of said seat belt to a portion of the vehicle door.

4. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to said other side of said seat and a portion of said seat belt disposed intermediate said first and second part thereof is uninterrupted in extent and disposed generally to overlie continuously a portion of said seat for any open or closed position of said vehicle door; means securely attached to a portion of a vehicle for biasing said seat belt in a predetermined manner; and means securely attached to a portion of a vehicle for releasably securing at least a part of said seat belt relative to the vehicle, said seat belt securing means including actuatable means adapted to be connected to a source of power, said actuatable means, in one position thereof, being disposed to secure at least a part of said seat belt relative to a portion of a vehicle and, in another position thereof, to permit free movement of said seat belt relative thereto.

5. A seat belt assembly for use in a vehicle, said assembly comprising a seat belt, a first part of which is constructed to be securely anchored relative to one side of a vehicle seat and a second part of which is constructed to be intercoupled with a portion of a vehicle door wherein said second part is securely anchored relative to the other side of the vehicle seat and a portion of said seat belt disposed intermediate said first and second part thereof is uninterrupted in extent and adapted generally to overlie continuously a portion of the vehicle seat for any open or closed position of the vehicle door; means constructed to be securely anchored to a portion of the vehicle for biasing said seat belt in a predetermined manner; and means constructed to be securely attached to a portion of a vehicle releasably securing at least a part of said seat belt relative to the vehicle portion, said seat belt securing means including actuatable means adapted to be connected to a source of power and responsive thereto, said power responsive means, in one position thereof, being disposed to secure at least a part of said seat belt relative to a portion of the vehicle and, in another position thereof, to permit free movement of said seat belt relative thereto.

6. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to the other side of said seat and a portion of said seat belt disposed intermediate said first and second parts thereof is uninterrupted in extent and disposed generally to overlie continuously a portion of said seat for any open or closed position of said vehicle door; means securely attached to a portion of the vehicle for biasing said seat belt in a predetermined manner; means securely attached to a portion of the vehicle for releasably securing at least a part of said seat belt relative to the vehicle; actuatable means for maintaining said vehicle door in the closed position; and means of unitary construction for intercoupling and actuatable means and said seat belt securing means wherein in one position of said actuatable means said seat belt securing means secures said seat belt relative to a portion of the vehicle while said actuatable means is disposed to prevent opening the vehicle door, and in another position of said actuatable means said seat belt is freely movable relative to said seat belt securing means and said actuatable means is disposed to permit opening of said vehicle door.

7. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to the other side of said seat and a portion of said seat belt disposed intermediate said first and second parts thereof is uninterrupted in extent and disposed generally to overlie continuously a portion of said seat for any open or closed position of said vehicle door; means securely attached to a portion of the vehicle for biasing said seat belt in a predetermined manner; means securely attached to a portion of the vehicle for releasably securing at least a part of said seat belt relative to the vehicle; actuatable means for maintaining said vehicle door in the closed position; and means for intercoupling said actuatable means and said seat belt securing means wherein in one position of said actuatable means said seat belt securing means secures said seat belt relative to a portion of the vehicle while said actuatable means is disposed to prevent opening the vehicle door, and in another position of said actuatable means said seat belt is freely movable relative to said seat belt securing means and said actuatable means is disposed to permit opening of said vehicle door; said seat belt including a third part which is securely anchored relative to said one side of said seat wherein a portion of said seat belt disposed intermediate said second and third parts is uninterrupted in extent and disposed generally in spaced-apart relation to a generally vertically disposed portion of said seat for any open or closed position of said vehicle door.

8. An assembly as described in claim 7 including means interconnecting a portion of said door and said second part of said seat belt.

9. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to the other side of said seat and a portion of said seat belt disposed intermediate said first and second parts thereof is uninterrupted in extent and disposed generally to overlie continuously a portion of said seat for any open or closed position of said vehicle door; means securely attached to a portion of the vehicle for biasing said seat belt in a predetermined manner; means securely attached to a portion of the vehicle for releasably securing at least a part of said seat belt relative to the vehicle; actuatable means for maintaining said vehicle door in the closed position; and means for intercoupling said actuatable means and said seat belt securing means wherein in one position of said actuatable means said seat belt securing means secures said seat belt relative to a portion of the vehicle while said actuatable means is disposed to prevent opening the vehicle door, and in another position of said actuatable means said seat belt is freely movable relative to said seat belt securing means and said actuatable means is disposed to permit opening of said vehicle door; said second part of said seat belt being intercoupled with a portion of said door by means mounted on said door for gimbal movement with respect to said door.

10. A seat belt assembly for use in a vehicle, said assembly comprising a seat belt, a first part of which is constructed to be securely anchored to one side of a vehicle seat and a second part of which is constructed to be intercoupled with a portion of a vehicle door wherein said second part is securely anchored relative to the other side of the vehicle seat and a portion of said seat belt disposed intermediate said first and second part thereof is uninterrupted in extent and adapted generally to overlie continuously a portion of the vehicle seat for any open or closed position of the vehicle door; means constructed to be securely anchored to a portion of a vehicle for biasing said seat belt in a predetermined manner; means constructed to be securely anchored to a portion of a vehicle for releasably securing at least a part of said seat belt relative to the vehicle portion; actuatable means constructed for mounting on a vehicle for maintaining in a closed position, a vehicle door disposed adjacent the vehicle seat over which said seat belt is adapted to overlie; means of unitary construction for intercoupling said actuatable means and said seat belt securing means when in one position thereof said seat belt securing means secures said seat belt relative to a portion of a vehicle while said actuatable means is disposed to prevent opening of a vehicle door and in another position thereof said seat belt is freely movable relative to said seat belt securing means and said actuatable means is disposed to permit opening of the vehicle door.

11. A seat belt assembly for use in a vehicle, said assembly comprising a seat belt, a first part of which is constructed to be securely anchored relative to one side of a vehicle seat and a second part of which is constructed to be intercoupled with a portion of a vehicle door wherein said second part is securely anchored relative to the other side of the vehicle seat and a portion of said seat belt disposed intermediate said first and second parts thereof is uninterrupted in extent and adapted generally to overlie continuously a portion of the vehicle seat for any open or closed position of the vehicle door; means constructed to be securely anchored to a portion of a vehicle for biasing said seat belt in a predetermined manner; and means constructed to be securely attached to a portion of a vehicle releasably securing at least a part of said seat belt relative to the vehicle portion, said seat belt securing means including a biased solenoid adapted to be connected to a source of power, said solenoid being disposed to secure at least a part of said seat belt relative to a portion of the vehicle upon being disconnected from a source of power and to permit free movement of said seat belt relative thereto when connected to a source of power.

12. A seat belt assembly as described in claim 11 in which said biasing means includes a spring-biased, rotatably mounted reel means.

13. A seat belt assembly for use in a vehicle, said assembly comprising a seat belt, a first part of which is constructed to be securely anchored relative to one side of a vehicle seat and a second part of which is constructed to be intercoupled with a portion of a vehicle door wherein said second part is securely anchored relative to the other side of the vehicle seat and a portion of said seat belt disposed intermediate said first and second part thereof is uninterrupted in extent and adapted generally to overlie continuously a portion of the vehicle seat for any open or closed position of the vehicle door; means constructed to be securely anchored to a portion of a vehicle for biasing said seat belt in a predetermined manner; means constructed to be securely anchored to a portion of a vehicle for releasably securing at least a part of said seat belt relative to the vehicle portion; actuatable means constructed for mounting on a vehicle for maintaining in a closed position, a vehicle door disposed adjacent the vehicle seat over which said seat belt is adapted to overlie; means for intercoupling said actuatable means and said seat belt securing means when in one position thereof said seat belt securing means secures said seat belt relative to a portion of a vehicle while said actuatable means is disposed to prevent opening of a vehicle door and in another position thereof said seat belt is freely movable relative to said seat belt securing means and said actuatable means is disposed to permit opening of the vehicle door, said seat belt also including a third part which is securely anchored relative to one side of a vehicle seat wherein a portion of said seat belt disposed intermediate said second and third parts is uninterrupted in extent and adapted to be disposed generally in spaced-apart relation to a generally vertically disposed portion of a vehicle seat for any opened or closed position of the vehicle door.

14. A seat assembly as described in claim 13 including means constructed to interconnect a portion of the vehicle door and said second part of said seat belt.

15. A vehicle mounted, seat belt assembly comprising a vehicle seat; a door disposed adjacent one side of said vehicle seat; a seat belt a first part of which is securely anchored relative to one side of said seat and a second part of which is intercoupled with a portion of said door wherein said second part is securely anchored relative to the other side of said seat and a portion of said seat belt disposed intermediate said first and second parts thereof is uninterrupted in extent and disposed generally to overlie continuously a portion of said seat for any open or closed position of said vehicle door; means securely attached to a portion of the vehicle for biasing said seat belt in a predetermined manner; brake means securely attached to a portion of said vehicle for braking the travel of said seat belt; actuatable means for maintaining said vehicle door in the closed position; and means for intercoupling said actuatable means and said brake means wherein in one position of said actuatable means said brake means secures said seat belt relative to a portion of the vehicle while said actuatable means is disposed to prevent opening of the vehicle door, and in another position of said actuatable means said seat belt is freely movable relative to said braking means, and said actuatable means is disposed to perimt opening of said vehicle door.

References Cited

UNITED STATES PATENTS

| 2,710,649 | 6/1955 | Griswold | 297—388 |
|---|---|---|---|
| 2,852,270 | 9/1958 | Hunt | 280—150 |
| 2,855,028 | 10/1958 | Matthews | 280—150 |
| 2,937,882 | 5/1960 | Oppenheim | 280—150 |
| 3,172,700 | 3/1965 | Haas | 297—388 |
| 3,219,361 | 11/1965 | Brown | 180—82 |
| 3,266,842 | 8/1966 | Board et al. | 180—82 |

KENNETH H. BETTS, *Primary Examiner.*